Aug. 11, 1953  J. D. DE BLIEUX  2,648,072
BED CUSHION FOR AUTOMOBILES
Filed March 30, 1951  2 Sheets-Sheet 1

John D. DeBlieux
INVENTOR.

BY
*Attorneys*

Aug. 11, 1953  J. D. DE BLIEUX  2,648,072
BED CUSHION FOR AUTOMOBILES
Filed March 30, 1951  2 Sheets-Sheet 2
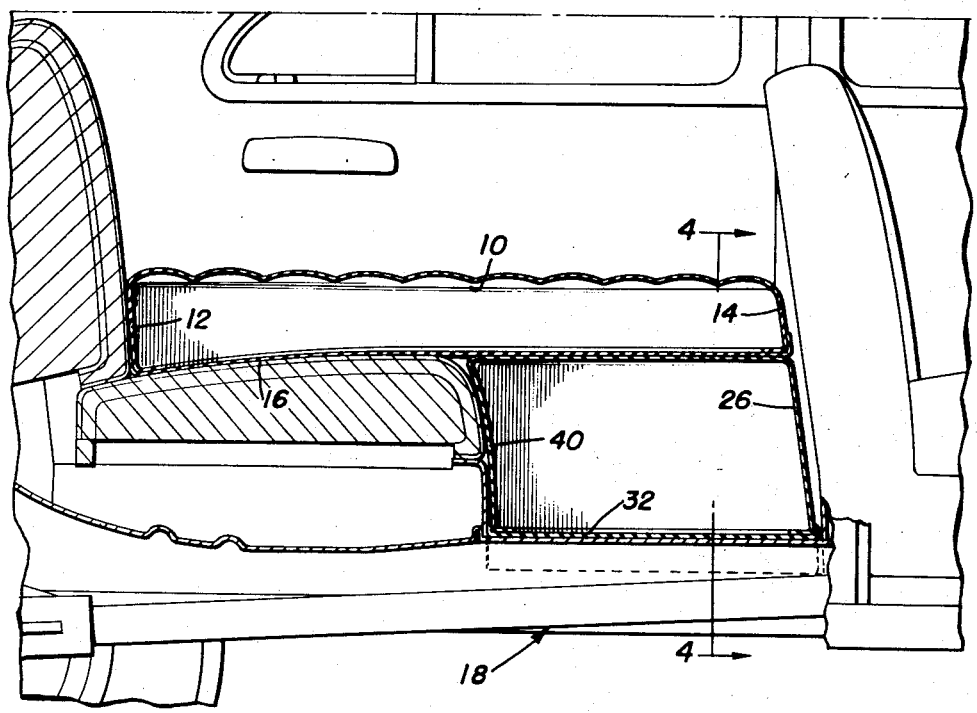
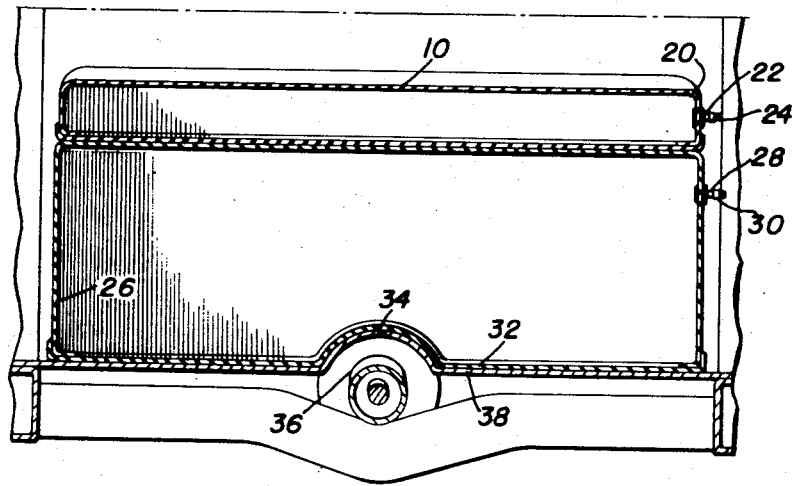
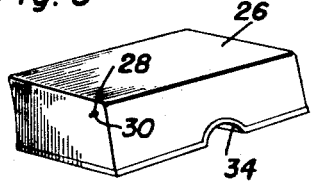
John D. De Blieux
INVENTOR.

Patented Aug. 11, 1953

2,648,072

UNITED STATES PATENT OFFICE 2,648,072

BED CUSHION FOR AUTOMOBILES

John D. De Blieux, Jacksonville, Fla.

Application March 30, 1951, Serial No. 218,436

2 Claims. (Cl. 5—94)

This invention relates to new and useful improvements in vehicle accessories and the primary object of the present invention is to provide a cushion for the rear seat of a passenger car whereby children or the like may recline in a comfortable manner.

Another object of the present invention is to provide a bed cushion for passenger cars of such a size as to overhang the rear seat and be supported by a member upon the floor of the car and which will extend between the sides of the car.

A further object of the present invention is to provide an inflatable cushion for use as a bed in vehicles and involving an inflatable, pneumatic support that will coact with the rear seat of a passenger car in supporting the bed cushion.

A still further aim of the present invention is to provide a bed cushion for vehicles that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged vertical sectional view taken substantially on the plane of section line 3—3 of Figure 2;

Figure 4 is a vertical sectional view taken substantially on the plane of section line 4—4 of Figure 3;

Figure 6 is a perspective view of the pneumatic support for the bed cushion.

Figure 1:
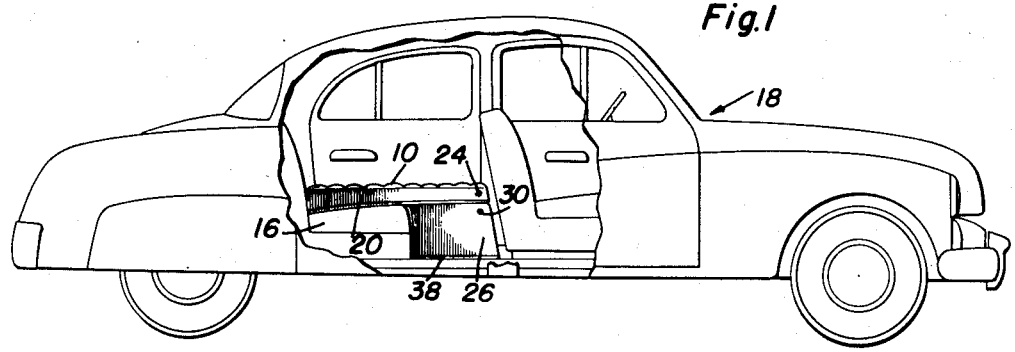
Figure 1 is a side elevational view of a vehicle with parts thereof broken away to illustrate the present invention positioned in the rear portion of the vehicle and supported upon the rear seat of the vehicle.
Figure 2:
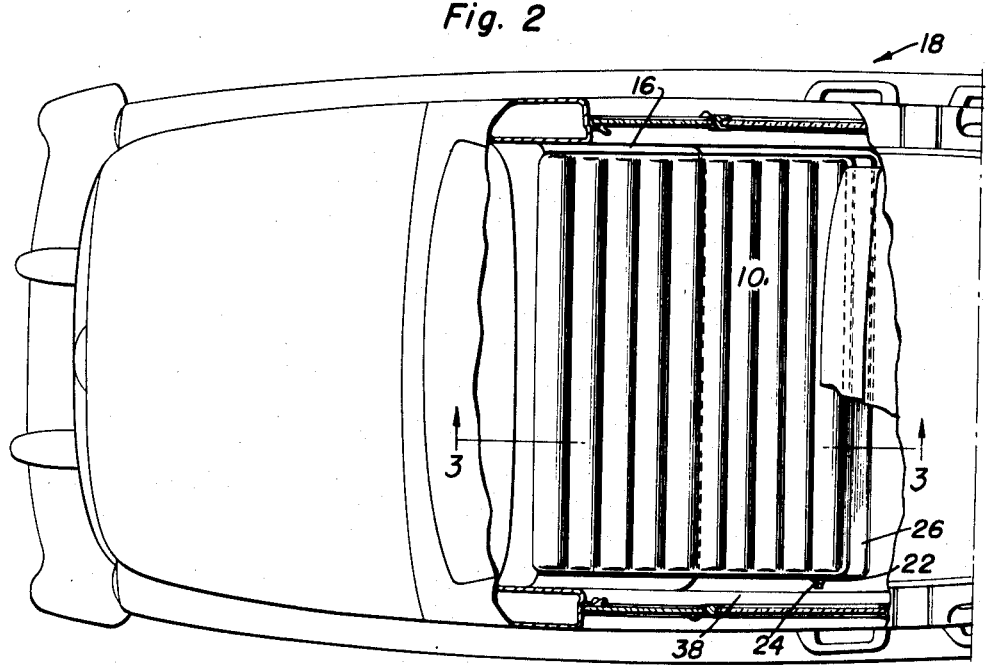
Figure 2 is a fragmentary top plan view of a passenger car, with parts broken away and shown in section, and illustrating the present invention mounted on the rear seat of the car.

Referring now to the drawings in detail, wherein for the purpose of illustration, there is disclosed a preferred embodiment of the present invention, the numeral 10 represents an elongated hollow inflatable, pneumatic cushion member of suitable air retaining material, such as rubber. The rear side wall 12 of the member 10 is slightly higher than the forward wall 14 of the member 10 so that the rear portion of the cushion member 10 will conform to the curvature of the rear seat 16 of a vehicle or pasenger car 18.

One end wall 20 of the pneumatic cushion 10 supports a filling valve 22 of the type commonly employed in innertubes. A closure cap 24 is provided for the filling valve or nipple 22 and is readily removable to permit a pump or the like to be applied to the nipple 22 in order to inflate the pneumatic cushion member 10.

Means is provided for supporting the portion of the cushion member 10 that overhangs the rear seat 16 of the passenger car 18. This means consists of an inflatable, resilient pneumatic casing 26 having a filler valve 28 at one wall that is provided with a closure cap 30. The bottom wall 32 of the resilient casing 26 is molded with a transverse concave recess 34 that will accommodate the drive shaft hump 36 in the floor of the vehicle which is designated by the numeral 38. The rear wall 40 of the casing 26 is shaped to conform to the forward portion of the rear seat 16 as illustrated best in Figure 3 of the drawings.

The upper wall of the cushion member 10 may be undulated in cross section as illustrated in Figure 3 or substantially flat and horizontal, this result being obtained due to the fact that the rear wall 12 of the cushion member is considerably higher than the forward wall 14.

In practical use of the present invention, the cushion member 10 extends from side to side of the passenger car and is supported upon the rear seat 16 as illustrated in Figure 3. The cushion member 10 includes a forward portion that overhangs the seat 16 and which is supported upon the upper flat wall of the rubber casing 26. The cushion member 10 also extends from the rear seat to the forward seat to provide a large sleeping area for children or the like.

Figure 5:
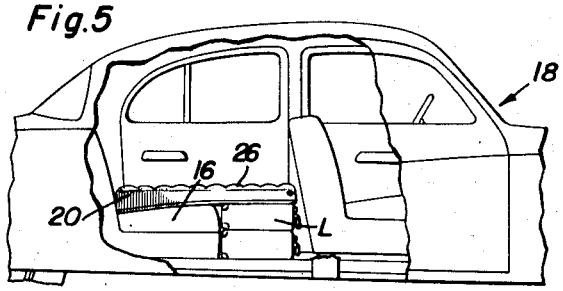
Figure 5 is a view similar to Figure 1 but illustrating luggage supporting the overhanging portion of the bed cushion rather than the inflatable member as illustrated in Figure 1.

Figure 5 illustrates a modified means for supporting the forward overhanging portion of the cushion member 10. In this embodiment, luggage or small grips L replace the rubber casing 26 with the upper face of the uppermost luggage substantially coplanar with the higher point of the rear seat 16.

Obviously, a small adapter could be applied to the valve nipple 22 for supporting a capsule filled with carbon dioxide. By puncturing the closed neck of the capsule, air in the capsule will pass into the cushion member 10 to inflate the latter. This same alternate construction could be embodied in the rubber casing 26.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a passenger car including forward and rear seats, a cushion supported on the rear seat and extending from the rear seat to the forward seat, said cushion including a portion overhanging the rear seat, and an inflatable casing on the floor of the vehicle underlying and supporting the overhanging portion of the cushion, said casing having a flat upper wall engaging substantially the entire under surface of said overhanging portion.

2. In a passenger car including forward and rear seats, a cushion supported on the rear seat and extending from the rear seat to the forward seat, said cushion including a portion overhanging the rear seat, and an inflatable casing supported on the floor of the car between the forward and rear seats and including a rear concave wall conforming to the front of the rear seat and a lower wall having a transverse recess adapted to accommodate the drive shaft hump in the floor of the car.

JOHN D. DE BLIEUX.

References Cited in the file of this patent

UNITED STATES PATENTS

| Number | Name | Date |
|---|---|---|
| 1,238,480 | Austin | Aug. 28, 1917 |
| 1,333,924 | Kay | Mar. 16, 1920 |
| 1,567,117 | Daniels | Dec. 29, 1924 |
| 2,493,170 | Stiff et al. | Jan. 3, 1950 |
| 2,533,792 | Hall | Dec. 12, 1950 |